(12) United States Patent
Gao et al.

(10) Patent No.: US 11,389,758 B2
(45) Date of Patent: Jul. 19, 2022

(54) VERTICAL TYPE COMBINED FILTER SEPARATOR

(71) Applicant: Shenyang Xinlian Petro—chemical Equipment Co., Ltd., Shenyang (CN)

(72) Inventors: Yang Gao, Shenyang (CN); Jinguo Cai, Shenyang (CN); Haotian Liu, Shenyang (CN); Jingchao Zhao, Shenyang (CN)

(73) Assignee: Shenyang Xinlian Petro-chemical Equipment Co., Ltd., Shenyang (CN)

( * ) Notice: Subject to any disclaimer, the term of this patent is extended or adjusted under 35 U.S.C. 154(b) by 0 days.

(21) Appl. No.: 17/470,322

(22) Filed: Sep. 9, 2021

(65) Prior Publication Data

US 2022/0072459 A1    Mar. 10, 2022

(30) Foreign Application Priority Data

Sep. 10, 2020 (CN) .......................... 202010945859.5

(51) Int. Cl.
| | |
|---|---|
| *B01D 45/16* | (2006.01) |
| *B01D 50/20* | (2022.01) |
| *B01D 46/00* | (2022.01) |
| *C10L 3/10* | (2006.01) |

(52) U.S. Cl.
CPC ......... *B01D 45/16* (2013.01); *B01D 46/0005* (2013.01); *B01D 50/20* (2022.01); *C10L 3/101* (2013.01)

(58) Field of Classification Search
CPC .... B01D 45/16; B01D 46/0005; B01D 50/20; B01D 46/2407; C10L 3/101; C10L 2290/547
See application file for complete search history.

(56) References Cited

U.S. PATENT DOCUMENTS

| | | | | |
|---|---|---|---|---|
| 3,063,220 A | * | 11/1962 | Almquist ................. | B01D 3/16 96/365 |
| 4,180,391 A | * | 12/1979 | Perry, Jr. ................. | B01D 45/16 55/424 |
| 2011/0011796 A1 | * | 1/2011 | Nickson ................... | B04C 5/14 210/512.2 |

(Continued)

FOREIGN PATENT DOCUMENTS

CN          108148643 A * 6/2018 ........... B01D 46/002

*Primary Examiner* — Hung Q Nguyen
(74) *Attorney, Agent, or Firm* — Capitol City TechLaw, PLLC; Samuel P. Burkholder (57) ABSTRACT

The present disclosure discloses a vertical type combined filter separator, including a shell. The inside of the shell is divided into a first cavity, a second cavity, a third cavity, a fourth cavity and a fifth cavity in sequence from a first end to a second end. A gas intake connection pipe is arranged on the second cavity, and several cyclone separators are arranged in the second cavity. For each cyclone separator, a gas inlet is exposed into the second cavity, a dust discharging port communicates with the first cavity, and an exhaust port communicates with the third cavity. The third cavity passes through the fourth cavity through the communicating pipe and directly communicates with the fifth cavity. The fifth cavity communicates with the fourth cavity through a filter separation assembly. A gas outlet connection pipe for discharging separated purified gas is arranged on the fourth cavity.

8 Claims, 5 Drawing Sheets

(56) References Cited

U.S. PATENT DOCUMENTS

| | | | | |
|---|---|---|---|---|
| 2013/0247764 A1* | 9/2013 | Kvamsdal | ......... | B01D 19/0057 96/208 |
| 2013/0276416 A1* | 10/2013 | Schook | ................. | B01D 45/08 55/462 |

* cited by examiner

VERTICAL TYPE COMBINED FILTER SEPARATOR

CROSS REFERENCE TO RELATED APPLICATION(S)

This patent application claims the benefit and priority of Chinese Patent Application No. 202010945859.5, filed on Sep. 10, 2020, the disclosure of which is incorporated by reference herein in its entirety as part of the present application.

TECHNICAL FIELD

The present disclosure relates to the technical field of filter separators, and particularly relates to a vertical type combined filter separator.

BACKGROUND ART

Gas, such as natural gas, usually contains more solids and liquid impurities. At present, for natural gas purification, cyclone separation equipment and filter separator equipment are usually provided respectively, and the two sets of equipment are connected together through valves and pipelines. The natural gas passes through the cyclone separation equipment first to remove large-diameter impurity particles from the gas, and then enters the filter separator equipment to filter and separate the impurities in the gas to meet the requirement of gas purification. However, since a cyclone separator and a filter separator are used to purify the natural gas, the equipment occupies a large area and is extremely inconvenient to use. Therefore, how to solve the problems in the existing art that the equipment for purifying natural gas occupies a large area and is not convenient to use is a technical problem urgently needed to be solved by those skilled in the art.

SUMMARY

In order to solve the above technical problems, the present disclosure provides a vertical type combined filter separator which has simple and compact structure and occupies a smaller area.

To achieve the above-mentioned purpose, the present disclosure provides the following solution.

The present disclosure provides a vertical type combined filter separator, including: a shell which has a closed cavity inside and is of a barrel-shaped structure. The inside of the shell is divided into a first cavity, a second cavity, a third cavity, a fourth cavity and a fifth cavity in sequence from a first end to a second end; a gas intake connection pipe for allowing gas to be purified to enter is arranged on the second cavity; several cyclone separators for axial gas feeding are arranged in the second cavity; for each cyclone separator, a gas inlet is exposed into the second cavity, a dust discharging port communicates with the first cavity, and an exhaust port communicates with the third cavity; the third cavity passes through the fourth cavity through the communicating pipe and directly communicates with the fifth cavity; the fifth cavity communicates with the fourth cavity through a filter separation assembly; and a gas outlet connection pipe for discharging separated purified gas is arranged on the fourth cavity.

Further, a plurality of filter separation assemblies are provided; each filter separation assembly includes a filter element and a filter element bracket; the number of the filter elements is the same as the number of the filter element brackets, and the filter elements and the filter element brackets correspond to each other on a one-to-one basis; each filter element bracket is of a hollow structure, one end of which communicates with the fourth cavity, and the other end of which communicates with the fifth cavity; the filter elements are arranged at the ends of the corresponding filter element brackets located in the fifth cavity to filter gas entering the filter element brackets.

Further, the shell includes a cylindrical section with openings in two ends, a closure head arranged at a first end of the cylindrical section and fixedly connected with the cylindrical section, and a fast-opening blind arranged at a second end of the cylindrical section and fixedly connected with the cylindrical section.

Further, a first partition plate, a second partition plate, a third partition plate and a fourth partition plate are arranged in the shell; an independent cavity is formed between any two adjacent partition plates from among the four partition plates; an independent cavity is also formed between the first partition plate and the closure head as well as between the fourth partition plate and the fast-opening blind; the respective independent cavities respectively form the first cavity, the second cavity, the third cavity, the fourth cavity, and the fifth cavity.

Further, the closure head is a rotator structure protruding away from the cylindrical section; the outer side of the closure head is also provided with a connection pipe communicating with the inside of the closure head; and a cover plate used to close and open the connection pipe is arranged at a pipe orifice of an end of the connection pipe away from the closure head.

Further, an access hole communicating with the second cavity and a cover plate used to close and open the access hole are also arranged on the second cavity.

Further, a skirt support used to support the shell is arranged outside the first end of the shell.

Further, the first cavity, the fourth cavity, and the fifth cavity are respectively provided with process connection pipes communicating with the insides of the cavities.

Compared with the existing art, the following beneficial technical effects are achieved in the present disclosure. A vertical type combined filter separator of the present disclosure includes: a shell which has a closed cavity inside and is of a barrel-shaped structure. The inside of the shell is divided into a first cavity, a second cavity, a third cavity, a fourth cavity and a fifth cavity in sequence from a first end to a second end. A gas intake connection pipe for allowing gas to be purified to enter is arranged on the second cavity, and several cyclone separators for axial gas feeding are arranged in the second cavity. For each cyclone separator, a gas inlet is exposed into the second cavity, a dust discharging port communicates with the first cavity, and an exhaust port communicates with the third cavity. The third cavity passes through the fourth cavity through the communicating pipe and directly communicates with the fifth cavity. The fifth cavity communicates with the fourth cavity through a filter separation assembly. A gas outlet connection pipe for discharging separated purified gas is arranged on the fourth cavity.

During use, gas to be purified, such as natural gas, is fed into the second cavity from the gas intake connection pipe on the second cavity. Since the gas inlet of the cyclone separator is exposed into the second cavity, the gas entering the second cavity will enter the cyclone separator; large-diameter particle impurities in the cyclone separator enter the first cavity from the dust discharging port for collection, and the purified gas enters the third cavity from the exhaust port of the cyclone separator and enters the fifth cavity through the communicating pipe. The fifth cavity communicates with the fourth cavity through the filter separation assembly, so that in the process that the gas entering the fifth cavity enters the fourth cavity, solid impurities and liquid impurities in the gas can be removed by the filter separation assembly to meet a purification requirement, and the gas is discharged through the gas outlet connection pipe on the fourth cavity.

As such, the vertical type combined filter separator provided by the present disclosure is simple and compact in structure, occupies a smaller area, and can effectively reduce the use area of an equipment field, reduce the capital investment of items and reduce the cost and time for later operation and maintenance of the equipment.

BRIEF DESCRIPTION OF THE DRAWINGS

To describe embodiments of the present disclosure or technical solutions in the existing art more clearly, drawings required to be used in the embodiments will be briefly introduced below. It is apparent that the drawings in the descriptions below are only some embodiments of the present disclosure. Those of ordinary skill in the art also can obtain other drawings according to these drawings without making creative work.

Reference signs in the drawings: 1: skirt support; 2: process connection pipe; 3: shell; 4: gas intake connection pipe; 5: cyclone separator; 6: communicating pipe; 7: filter separation assembly; 8: fast-opening blind; 9: gas outlet connection pipe; 10: access hole; 11: filter element; 12: filter element bracket; 13: partition plate; 14: connection pipe; 15: closure head; 16: gas inlet; 17: exhaust port; 18: dust discharging port; and 19: blade.

DETAILED DESCRIPTION OF THE EMBODIMENTS

The technical solutions in the embodiments of the present disclosure will be clearly and completely described below in conjunction with the accompanying drawings in the embodiments of the present disclosure. Apparently, the described embodiments are only a part of the embodiments of the present disclosure, rather than all the embodiments. Based on the embodiments in the present disclosure, all other embodiments obtained by those of ordinary skill in the art without creative work shall fall within the protection scope of the present disclosure.

The present disclosure aims to provide a vertical type combined filter separator which has simple and compact structure and occupies a smaller area.

In order to make the above-mentioned purposes, characteristics and advantages of the present disclosure more obvious and understandable, the present disclosure is further described in detail below with reference to the accompanying drawings and specific implementation modes.

Figure 6:
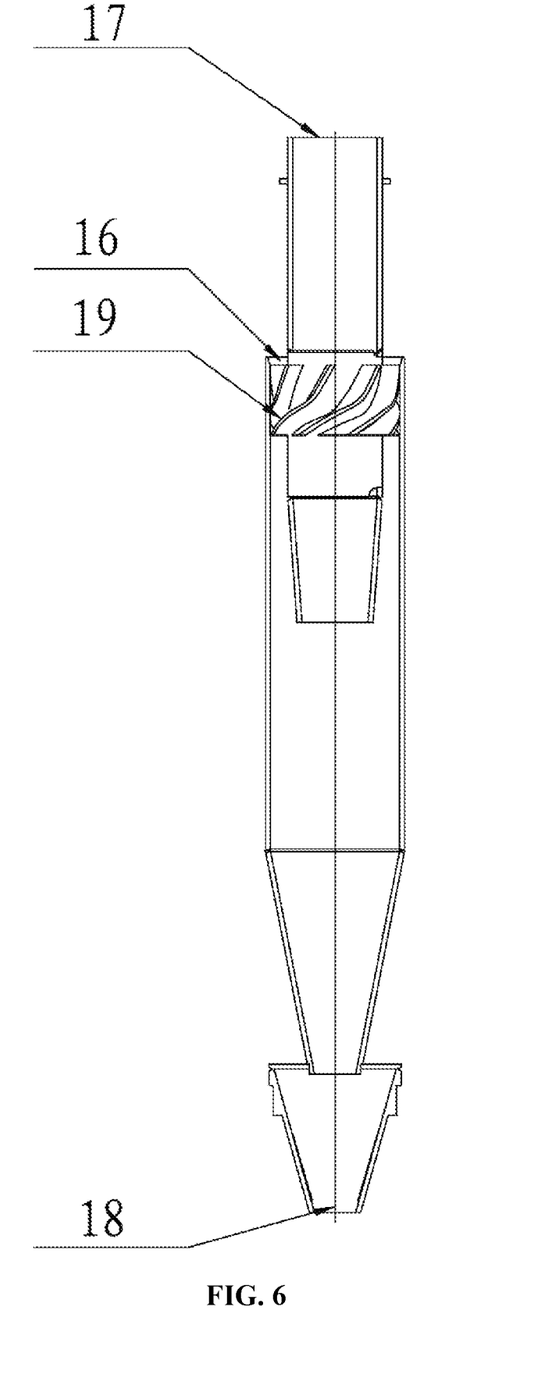
FIG. 6 is a schematic structural diagram of a cyclone separator in the vertical type combined filter separator in FIG. 1.

As shown in FIGS. 1-5, the embodiments of the present disclosure provide a vertical type combined filter separator, including a shell 3 which is of a barrel-shaped structure and has a closed cavity inside. The inside of the shell 3 is sequentially divided into a first cavity, a second cavity and a third cavity from a first end and a second end. A gas intake connection pipe 4 for allowing gas to be purified to enter is arranged on the second cavity; and the gas to be purified may enter the second cavity through the gas intake connection pipe 4. Several cyclone separators 5 for axial gas feeding are arranged in the second cavity. As shown in FIG. 6, a gas inlet 16, a dust discharging port 18 and an exhaust port 17 are formed in the cyclone separator 5; the gas inlet 16 is provided with a plurality of spirally disposed blades 19; gas enters the cyclone separator 5 from the gas inlet 16; furthermore, when gas passes through the gas inlet 16, due to the guiding effect of the blades 19, the gas entering the cyclone separator 5 rotates along the inner wall of the cyclone separator 5; under the action of a centrifugal force, large-diameter particulate matters fly to the inner wall of the cyclone separator and slide down along the inner wall till the particulate matters are discharged from the dust discharging port 18 in the lower end; and the preliminarily purified gas is discharged from the upper exhaust port 17 to complete preliminary separation of the impurities. The gas inlet 16 of each cyclone separator 5 is exposed into the second cavity, so that the gas entering the second cavity can enter the cyclone separator 5; the dust discharging port 18 of each cyclone separator 5 communicates with the first cavity; and the exhaust port 17 of each cyclone separator 5 communicates with the third cavity to discharge the purified gas into the third cavity. The third cavity passes through the fourth cavity through the communicating pipe 6 and directly communicates with the fifth cavity, so that the gas in the third cavity directly enters the fifth cavity. The fifth cavity communicates with the fourth cavity through the filter separation assembly 7, so that the gas in the fifth cavity enters the fourth cavity after solid and liquid impurities are filtered and separated through the filter separation assembly 7. A gas outlet connection pipe 9 for discharging the separated purified gas is arranged on the fourth cavity.

Figure 1:
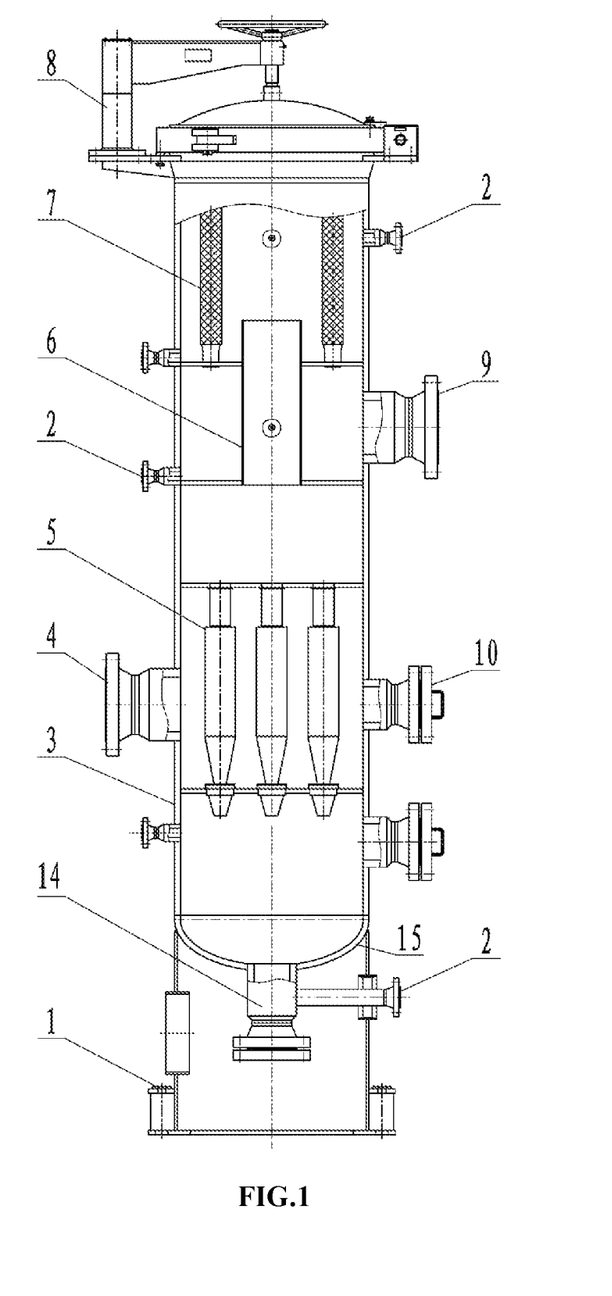
FIG. 1 is a schematic structural diagram of a vertical type combined filter separator in the embodiments of the present disclosure.

During use, gas to be purified, such as natural gas, is fed into the second cavity from the gas intake connection pipe on the second cavity. Since the gas inlet 16 of the cyclone separator 5 is exposed into the second cavity, the gas entering the second cavity will enter the cyclone separator 5; large-diameter particle impurities in the cyclone separator 5 enter the first cavity from the dust discharging port 18 for collection, and the purified gas enters the third cavity from the exhaust port 17 of the cyclone separator 5 and enters the fifth cavity through the communicating pipe 6. The fifth cavity communicates with the fourth cavity through the filter separation assembly 7, so that in the process that the gas entering the fifth cavity enters the fourth cavity, solid impurities and liquid impurities in the gas can be removed by the filter separation assembly 7 to meet a purification requirement, and the gas is discharged through the gas outlet connection pipe 9 on the fourth cavity.

As such, the vertical type combined filter separator provided by the present disclosure is simple and compact in structure, occupies a smaller area, and can effectively reduce the use area of an equipment field, reduce the capital investment of items and reduce the cost and time for later operation and maintenance of the equipment.

Figure 2:
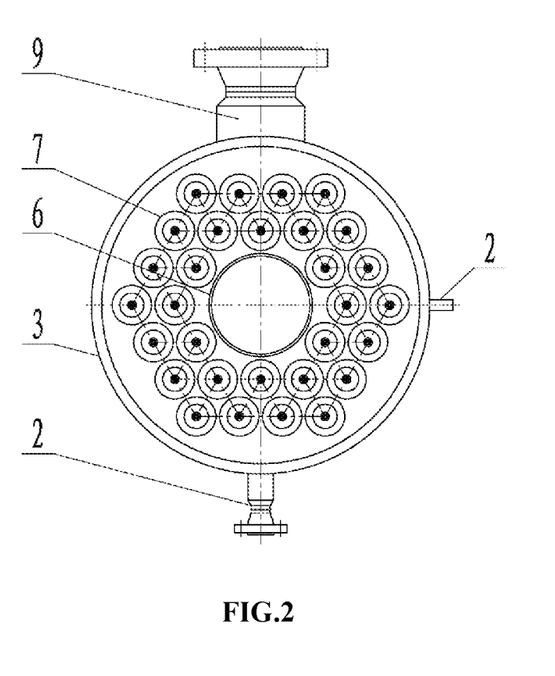
FIG. 2 is a schematic sectional diagram of a position where a filter separation assembly of the vertical type combined filter separator in FIG. 1 is located.
Figure 3:
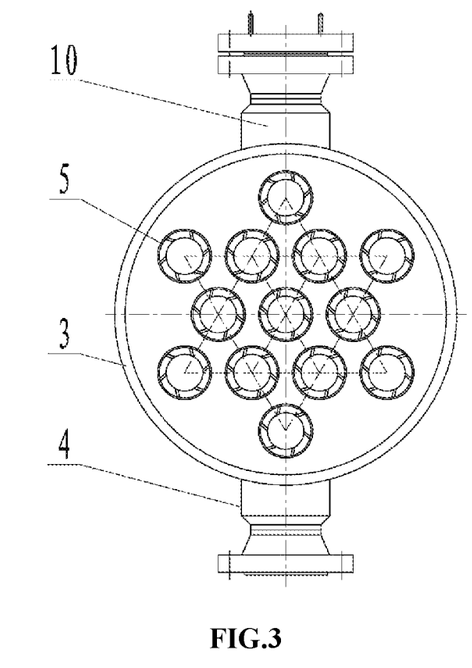
FIG. 3 is a schematic sectional diagram of a position where a cyclone separator of the vertical type combined filter separator in FIG. 1 is located.
Figure 4:
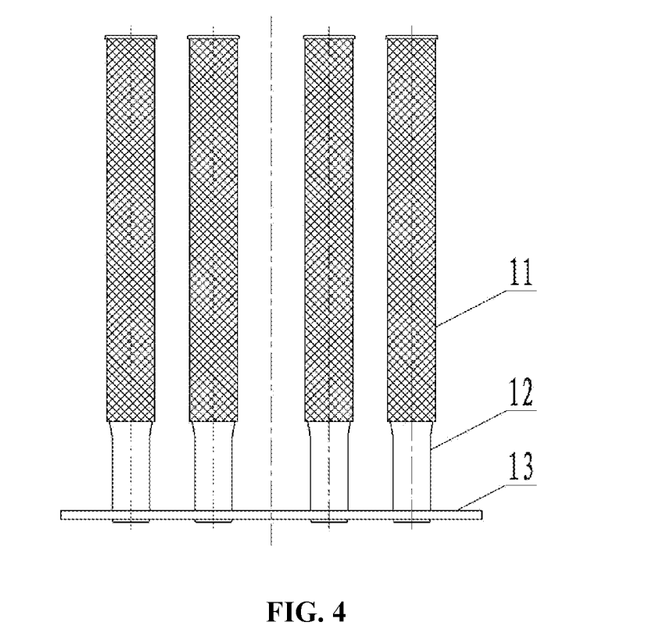
FIG. 4 is a schematic diagram of an installation state of a filter separation assembly of the vertical type combined filter separator in FIG. 1 is located.
Figure 5:
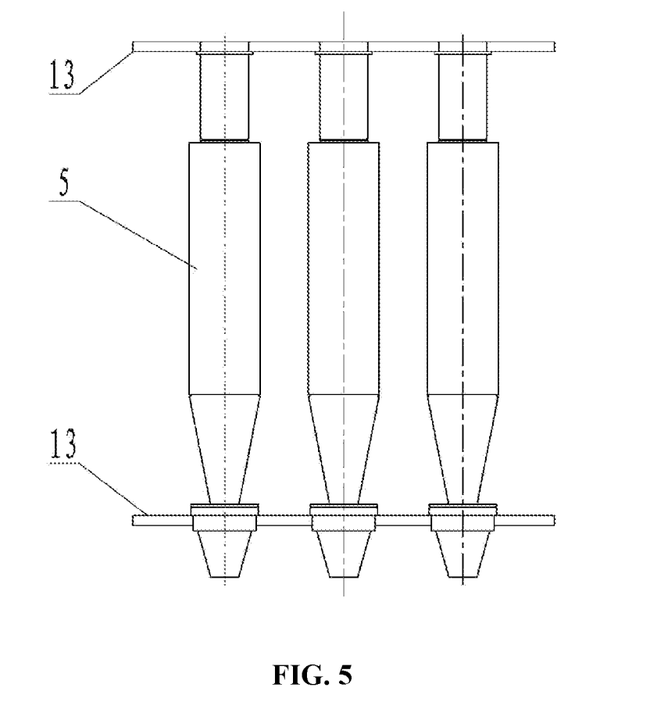
FIG. 5 is a schematic diagram of an installation state of a cyclone separator of the vertical type combined filter separator in FIG. 1 is located.

Referring to FIGS. 2 and 4, in some embodiments, there are a plurality of filter separation assemblies 7. Each filter separation assembly 7 includes a filter element 11 and a filter element bracket 12. The number of the filter elements 11 is the same as the number of the filter element brackets 12, and the filter elements and the filter element brackets correspond to each other on a one-to-one basis; each filter element bracket 12 is of a hollow structure, one end of which communicates with the fourth cavity, and the other end of which communicates with the fifth cavity. The filter elements 11 are arranged at the ends of the corresponding filter element brackets 12 located in the fifth cavity to filter gas entering the second cavity. As such, the gas in the fifth cavity is filtered by the filter element 11, then enters the fourth cavity through the filter element bracket 12, and is discharged, so as to complete separation of the solid impurities and the liquid impurities from the gas.

Referring to FIG. 1, in some embodiments, the shell 3 includes a cylindrical section with openings in two ends, a closure head 15 arranged at a first end of the cylindrical section and fixedly connected with the cylindrical section, and a fast-opening blind 8 arranged at a second end of the cylindrical section and fixedly connected with the cylindrical section. Optionally, the closure head 15 and the fast-opening blind 8 can be fixedly connected with the cylindrical section in a welded manner. It should be noted that the fast-opening blind 8 belongs to a product in the existing art, and a construction principle thereof is omitted here. By the arrangement of the fast-opening blind 8, the shell 3 can be opened or closed conveniently and quickly. Optionally, the closure head 15 is a rotator structure protruding away from the cylindrical section; the outer side of the closure head 15 is also provided with a connection pipe 14 communicating with the inside of the closure head 15; and a cover plate used to close and open the connection pipe 14 is arranged at a pipe orifice of an end of the connection pipe 14 away from the closure head 15. Optionally, the cover plate can be connected to a flange of the connection pipe 14 through a bolt. As such, when more dust falling into the first cavity from the dust discharging port 18 of the cyclone separator 5 is accumulated, the cover plate on the connection pipe 14 can be opened to discharge the dust.

As shown in FIG. 1, in some embodiments, a first partition plate 13, a second partition plate 13, a third partition plate 13, and a fourth partition plate 13 are arranged in the shell 3. An independent cavity is formed between any two adjacent partition plates from among the four partition plates 13; an independent cavity is also formed between the first partition plate 13 and the closure head 15 as well as between the fourth partition plate 13 and the fast-opening blind 8; the respective independent cavities respectively form the first cavity, the second cavity, the third cavity, the fourth cavity, and the fifth cavity. All the partition plates 13 can be fixedly connected to the inner wall of the shell 3 in a welded manner. All the cyclone separator 5 and all the filter separation assemblies 7 are connected with the shell 3 through the partition plates 13.

As shown in FIG. 1, in some embodiments, an access hole 10 communicating with the second cavity and a cover plate used to close and open the access hole 10 are also arranged on the second cavity. The cover plate can be connected to a flange at an orifice of the access hole 10 through a bolt. By means of the arrangement of the access hole 10, the inside of the equipment can be checked or maintained.

Referring to FIG. 1, in some embodiments, a skirt support 1 used to support the shell 3 is arranged outside the first end of the shell 3. By the arrangement of the skirt support 1, the whole device can be supported more stably.

As shown in FIG. 1, in some embodiments, the first cavity, the fourth cavity, and the fifth cavity are respectively provided with process connection pipes 2 communicating with the insides of the cavities. By the arrangement of the process connection pipes 2, various detection elements are convenient to install.

The principle and implementation modes of the present disclosure are described by applying specific examples in the present specification. The descriptions of the above embodiments are only intended to help to understand the method of the present disclosure and a core idea of the method. In addition, those ordinarily skilled in the art can make changes to the specific implementation modes and the application scope according to the idea of the present disclosure. From the above, the contents of the specification shall not be deemed as limitations to the present disclosure.

What is claimed is:

1. A vertical type combined filter separator, comprising: a shell which has a closed cavity inside and is of a barrel-shaped structure, wherein the inside of the shell is divided into a first cavity, a second cavity, a third cavity, a fourth cavity and a fifth cavity in sequence from a first end to a second end; a gas intake connection pipe for allowing gas to be purified to enter is arranged on the second cavity; several cyclone separators for axial gas feeding are arranged in the second cavity; for each cyclone separator, a gas inlet is exposed into the second cavity, a dust discharging port communicates with the first cavity, and an exhaust port communicates with the third cavity; the third cavity passes through the fourth cavity through the communicating pipe and directly communicates with the fifth cavity; the fifth cavity communicates with the fourth cavity through a filter separation assembly; and a gas outlet connection pipe for discharging separated purified gas is arranged on the fourth cavity.

2. The vertical type combined filter separator according to claim 1, wherein a plurality of filter separation assemblies are provided; each filter separation assembly comprises a filter element and a filter element bracket; the number of the filter elements is the same as the number of the filter element brackets, and the filter elements and the filter element brackets correspond to each other on a one-to-one basis; each filter element bracket is of a hollow structure, one end of which communicates with the fourth cavity, and the other end of which communicates with the fifth cavity; the filter elements are arranged at the ends of the corresponding filter element brackets located in the fifth cavity to filter gas entering the filter element brackets.

3. The vertical type combined filter separator according to claim 1, wherein the shell comprises a cylindrical section with openings in two ends, a closure head arranged at a first end of the cylindrical section and fixedly connected with the cylindrical section, and a fast-opening blind arranged at a second end of the cylindrical section and fixedly connected with the cylindrical section.

4. The vertical type combined filter separator according to claim 3, wherein a first partition plate, a second partition plate, a third partition plate and a fourth partition plate are arranged in the shell; an independent cavity is formed between any two adjacent partition plates from among the four partition plates; an independent cavity is also formed between the first partition plate and the closure head, and between the fourth partition plate and the fast-opening blind; and the respective independent cavities respectively form the first cavity, the second cavity, the third cavity, the fourth cavity, and the fifth cavity.

5. The vertical type combined filter separator according to claim 3, wherein the closure head is a rotator structure protruding away from the cylindrical section; the outer side of the closure head is also provided with a connection pipe communicating with the inside of the closure head; and a cover plate used to close and open the connection pipe is arranged at a pipe orifice of an end of the connection pipe away from the closure head.

6. The vertical type combined filter separator according to claim 1, wherein an access hole communicating with the second cavity and a cover plate used to close and open the access hole are also arranged on the second cavity.

7. The vertical type combined filter separator according to claim 1, wherein a skirt support used to support the shell is arranged outside the first end of the shell.

8. The vertical type combined filter separator according to claim 1, wherein the first cavity, the fourth cavity, and the fifth cavity are respectively provided with process connection pipes communicating with the insides of the cavities.

* * * * *